US012776529B2

(12) United States Patent
Kim et al.

(10) Patent No.: US 12,776,529 B2
(45) Date of Patent: Oct. 27, 2026

(54) ELECTRODE FOR RECHARGEABLE LITHIUM BATTERY, AND RECHARGEABLE LITHIUM BATTERY COMPRISING THE SAME

(71) Applicant: SAMSUNG SDI CO., LTD., Yongin-si (KR)

(72) Inventors: Suhyun Kim, Yongin-si (KR); Duckhyun Kim, Yongin-si (KR); Taejoong Kim, Yongin-si (KR); Hyunhee Kim, Yongin-si (KR); Hoyong An, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 903 days.

(21) Appl. No.: 18/004,046

(22) PCT Filed: May 12, 2022

(86) PCT No.: PCT/KR2022/006803
§ 371 (c)(1),
(2) Date: May 30, 2023

(87) PCT Pub. No.: WO2022/240211
PCT Pub. Date: Nov. 17, 2022

(65) Prior Publication Data

US 2024/0055687 A1 Feb. 15, 2024

(30) Foreign Application Priority Data

May 12, 2021 (KR) ........................ 10-2021-0061605

(51) Int. Cl.
*H01M 10/613* (2014.01)
*H01M 4/505* (2010.01)
(Continued)

(52) U.S. Cl.
CPC ......... *H01M 10/613* (2015.04); *H01M 4/505* (2013.01); *H01M 4/525* (2013.01); *H01M 4/602* (2013.01); *H01M 10/647* (2015.04)

(58) Field of Classification Search
CPC ....... H01M 4/602; H01M 4/366; H01M 4/667
See application file for complete search history.

(56) References Cited

U.S. PATENT DOCUMENTS

2013/0216902 A1 8/2013 Choy et al.
2016/0240836 A1 8/2016 Aotani et al.
(Continued)

FOREIGN PATENT DOCUMENTS

CN 110114914 A 8/2019
CN 110676434 A 1/2020
(Continued)

OTHER PUBLICATIONS

Lu, Weiming, et al., "A comparative study of carbons for use as an electrically conducting additive in the manganese dioxide cathode of an electrochemical cell," Letters to the editor, Carbon, vol. 40, 2002, pp. 447-449.
(Continued)

*Primary Examiner* — Christopher P Domone
(74) *Attorney, Agent, or Firm* — Womble Bond Dickinson (US) LLP

(57) ABSTRACT

The present invention relates to an electrode for a rechargeable lithium battery, and a rechargeable lithium battery including the same, the electrode including a current collector, a safety functional layer on the current collector, and an active material layer on the safety functional layer, wherein the functional safety layer comprises a heat-expandable polymer and an active material having a particle diameter of less than or equal to 2 μm.

20 Claims, 13 Drawing Sheets

(51) Int. Cl.

| | |
|---|---|
| ***H01M 4/525*** | (2010.01) |
| ***H01M 4/60*** | (2006.01) |
| ***H01M 10/647*** | (2014.01) |

(56) References Cited

U.S. PATENT DOCUMENTS

| | | | | |
|---|---|---|---|---|
| 2019/0140280 | A1 | 5/2019 | Zhang et al. | |
| 2019/0267621 | A1 | 8/2019 | Lee et al. | |
| 2019/0267664 | A1 | 8/2019 | Lin et al. | |
| 2019/0334157 | A1 | 10/2019 | Seok et al. | |
| 2019/0348666 | A1 | 11/2019 | Kim et al. | |
| 2020/0014078 | A1 | 1/2020 | Ha et al. | |
| 2020/0144595 | A1 | 5/2020 | Lin | |
| 2020/0194784 | A1 | 6/2020 | Lee et al. | |
| 2020/0295362 | A1* | 9/2020 | Lee | H01M 4/366 |
| 2020/0328410 | A1 | 10/2020 | Yoon | |
| 2020/0403276 | A1 | 12/2020 | Yamamoto et al. | |
| 2021/0043928 | A1 | 2/2021 | Yamamoto et al. | |
| 2022/0131155 | A1 | 4/2022 | Jin et al. | |
| 2023/0101947 | A1* | 3/2023 | Lee | H01M 4/621 429/221 |
| 2023/0275223 | A1* | 8/2023 | Kim | H01M 4/525 429/223 |
| 2023/0307656 | A1* | 9/2023 | Tang | H01M 4/663 |

FOREIGN PATENT DOCUMENTS

| | | | | |
|---|---|---|---|---|
| CN | 111758174 | A | | 10/2020 |
| CN | 111916664 | A | | 11/2020 |
| EP | 3547405 | A1 | | 10/2019 |
| JP | 2011-210649 | A | | 10/2011 |
| JP | 5704189 | B2 | | 4/2015 |
| KR | 10-2011-0117619 | A | | 10/2011 |
| KR | 10-2016-0061391 | A | | 5/2016 |
| KR | 10-2018-0045724 | A | | 5/2018 |
| KR | 10-2018-0065167 | A | | 6/2018 |
| KR | 10-2019-0012122 | A | | 2/2019 |
| KR | 10-2019-0012839 | A | | 2/2019 |
| KR | 10-2019-0012840 | A | | 2/2019 |
| KR | 10-2020-0106963 | A | | 9/2020 |
| KR | 10-2020-0108466 | A | | 9/2020 |
| KR | 10-2020-0119199 | A | | 10/2020 |
| KR | 10-2021-0019388 | A | | 2/2021 |
| KR | 10-2022-0111565 | A | | 8/2022 |
| WO | WO2019022423 | | * | 1/2019 |

OTHER PUBLICATIONS

Extended European Search Report issued in corresponding EP Application No. 22807858.0, dated Jun. 24, 2025.

International Search Report for corresponding Application No. PCT/KR2022/006803 dated Aug. 17, 2022, 4pp.

Chinese Notification of First Office Action, for Patent Application No. 202280010354.7, dated Jun. 8, 2026, 9 pages.

Korean Office Action for KR Application No. 10-2021-0061605, dated Aug. 5, 2026, 8 pages.

* cited by examiner

ELECTRODE FOR RECHARGEABLE LITHIUM BATTERY, AND RECHARGEABLE LITHIUM BATTERY COMPRISING THE SAME

CROSS-REFERENCE TO RELATED APPLICATION(S)

This application is a National Phase Patent Application of International Patent Application Number PCT/KR2022/006803, filed on May 12, 2022, which claims priority of Korean Patent Application No. 10-2021-0061605, filed May 12, 2021. The entire contents of both of which are incorporated herein by reference.

TECHNICAL FIELD

An electrode for a rechargeable lithium battery and a rechargeable lithium battery including the same are disclosed.

BACKGROUND ART

A portable information device such as a cell phone, a laptop, smart phone, and the like or an electric vehicle has used a rechargeable lithium battery having high energy density and easy portability as a driving power source. Recently, research has been actively conducted to use a rechargeable lithium battery with high energy density as a driving power source or power storage power source for hybrid or electric vehicles. One of the main research issues in such a rechargeable lithium battery is to improve the safety. For example, when a rechargeable lithium battery heats up due to an internal short circuit, overcharge, or overdischarge, and electrolyte decomposition reaction and thermal runaway occur, an internal pressure of the battery may rapidly increase to cause explosion of the battery. Among them, when an internal short-circuit of the rechargeable lithium battery occurs, high electrical energy stored in each electrode is instantly conducted at the short-circuited positive and negative electrodes, and a risk of explosion is very high. Since such an explosion may cause fatal damage to a user in addition to simply damaging the rechargeable lithium battery, it is urgent to develop a technology capable of improving the stability of the rechargeable lithium battery.

DISCLOSURE

Technical Problem

The present invention is to provide an electrode for a rechargeable lithium battery capable of prevent overheating or explosion of a battery by increasing internal resistance of the battery at issues such as heat exposure, penetration, crush, shock, etc. to secure thermal safety and physical safety as well as maintaining excellent battery performance and a rechargeable lithium battery including the same.

Technical Solution

In an embodiment, an electrode for a rechargeable lithium battery includes a current collector, a safety functional layer on the current collector, and an active material layer on the safety functional layer, wherein the safety functional layer includes a heat-expandable polymer and an active material having a particle diameter of less than or equal to 2 μm.

Another embodiment provides a rechargeable lithium battery including the electrode, a separator, and an electrolyte.

Advantageous Effects

An electrode for a rechargeable lithium battery and a rechargeable lithium battery including the same according to an embodiment may exhibit excellent battery performance such as high cycle-life characteristics and the like as well as an excellent effect of preventing overheating or explosion of the battery by increasing internal resistance of the battery at the issues such as heat exposure, penetration, crush, impact, etc.

MODE FOR INVENTION

Figure 1:
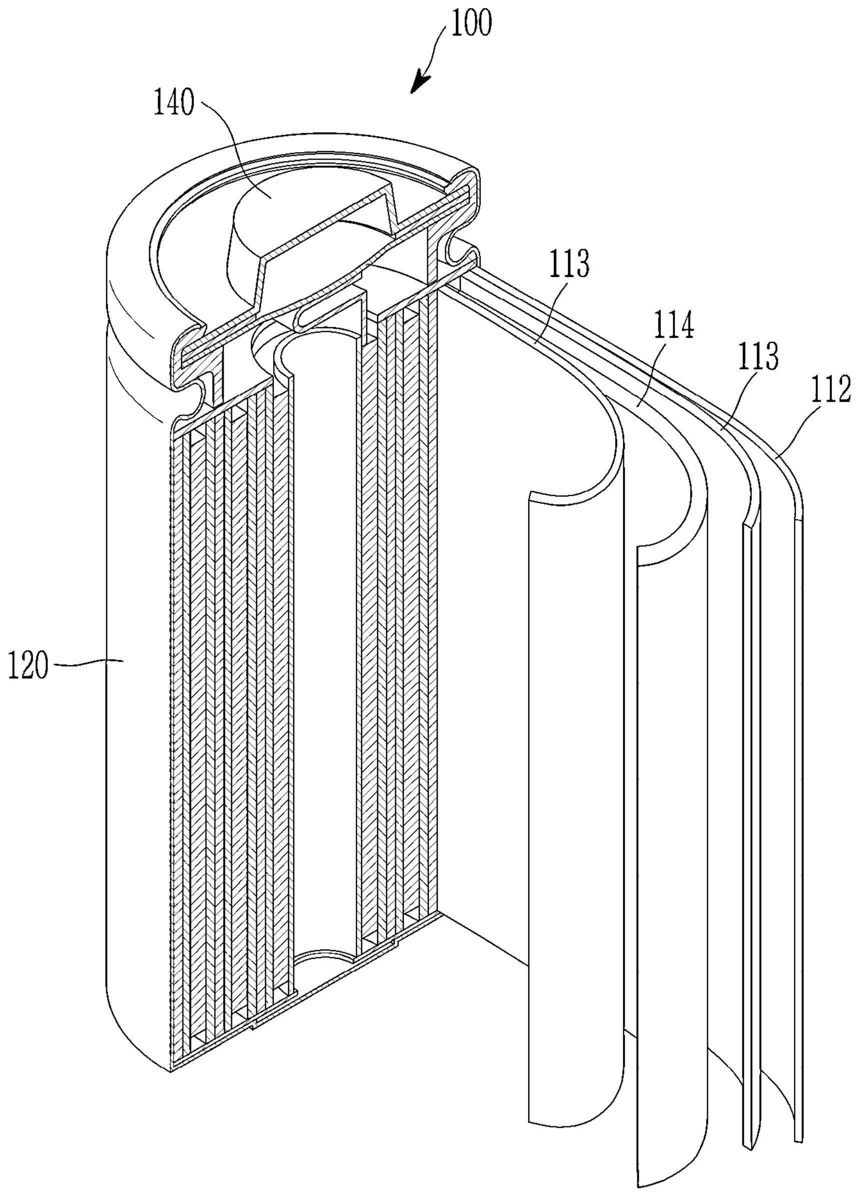
FIG. 1 is a schematic view illustrating a rechargeable lithium battery according to an embodiment.

Hereinafter, specific embodiments will be described in detail so that those of ordinary skill in the art can easily implement them. However, this disclosure may be embodied in many different forms and is not construed as limited to the example embodiments set forth herein.

The terminology used herein is used to describe embodiments only, and is not intended to limit the present invention. The singular expression includes the plural expression unless the context clearly dictates otherwise.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, "layer" herein includes not only a shape formed on the whole surface when viewed from a plan view, but also a shape formed on a partial surface.

In addition, the average particle diameter may be measured by a method well known to those skilled in the art, for example, may be measured by a particle size analyzer, or may be measured by a transmission electron micrograph or a scanning electron micrograph. Alternatively, it is possible to obtain an average particle diameter value by measuring using a dynamic light scattering method, performing data analysis, counting the number of particles for each particle size range, and calculating from this. Unless otherwise defined, the average particle diameter may mean the diameter (D50) of particles having a cumulative volume of 50 volume % in the particle size distribution.

In an embodiment, an electrode for a rechargeable lithium battery includes a current collector, a safety functional layer on the current collector, and an active material layer on the safety functional layer, wherein the safety functional layer includes a heat-expandable polymer and an active material having a particle diameter of less than or equal to 2 μm.

The electrode for a rechargeable lithium battery has an excellent effect of suppressing overheating and explosion of a battery by increasing resistance at physical issues such as thermal exposure, penetration, crush, impact and restricting movement of lithium ions and electrons to make a current difficult to flow. In particular, the electrode for a rechargeable lithium battery, compared with a conventional method of adding a thermally expandable polymer to an active material layer or introducing it as a separate layer in an electrode, may realize a high-capacity and high energy density battery with little loss of energy density due to capacity expression of the safety functional layer itself, have an advantage of maximizing performance of the battery during normal charging and discharging, exhibits increased strength of the safety functional layer due to the particulate active material having a particle size of 2 μm or less, and in addition, have an effect of protecting the current collector when the active material layer is compressed.

The safety functional layer may include, for example, the heat-expandable polymer and the active material having the particle diameter of less than or equal to 2 μm in a weight ratio of 1:9 to 9:1, and for example, 2:8 to 8:2, 3:7 to 7:3, or 4:6 to 6:4. In this case, the safety functional layer may effectively suppress overheating and explosion of the battery when a physical issue occurs while maximizing the basic performance of the battery.

The active material having the particle diameter of less than or equal to 2 μm may have a particle diameter (D50) of, for example, 10 nm to 2 μm, 10 nm to 1.5 μm, 10 nm to 1.2 μm, 10 nm to 1 μm, 10 nm to 900 nm, 50 nm to 1.2 μm, 100 nm to 1.2 μm, 200 nm to 1.2 μm, or 300 nm to 1.2 μm, 400 nm to 1.2 μm, or 500 nm to 1.2 μm. In addition, the active material having a particle diameter of less than or equal to 2 μm may be, for example, an active material having a particle diameter of 1.5 μm or less or an active material having a particle diameter of 1.2 μm or less. When the active material included in the safety functional layer satisfies the particle diameter ranges, there may be excellent effects of suppressing overheating and explosion of the battery at physical issues as well as maximizing basic performance of the battery and realizing high-capacity and a high energy density.

The active material having the particle diameter of less than or equal to 2 μm may include a compound capable of reversibly intercalating and deintercalating lithium. The compound capable of reversibly intercalating and deintercalating lithium may include, for example, lithium iron phosphate, lithium cobalt oxide, lithium manganese oxide, lithium nickel oxide, lithium nickel transition metal composite oxide, or a combination thereof. In the lithium-nickel transition metal composite oxide, the transition metal may be, for example, cobalt, manganese, aluminum, magnesium, titanium, copper, zinc, or a combination thereof.

The compound capable of reversibly intercalating and deintercalating lithium is specifically, for example, $LiFePO_4$, $LiCoO_2$, $LiMn_2O_4$, $LiNiO_2$, $LiNi_xM^1_yM^2_zO_2$ ($0<x<1$, $0<y<1$, $0\leq z<1$, $x+y+z=1$, and $M^1$ and $M^2$ are each independently at least one element selected from Co, Mn, Al, Cr, Fe, V, Mg, Ti, Zr, Nb, Mo, W, Cu, Zn, Ga, In, Sn, La, and Ce), or a combination thereof. In aforementioned chemical formulas, a molar content of Li may vary between approximately 0.9 and 1.2. The $LiNi_xM^1_yM^2_zO_2$ may be, for example, $LiNi_{x1}Co_{y1}M^3_{z1}O_2$ ($0<x1<1$, $0<y1<1$, $0\leq z1<1$, $x1+y1+z1=1$, and $M^3$ are at least one element selected from Mn, Al, Cr, Fe, V, Mg, Ti, Zr, Nb, Mo, W, Cu, Zn, Ga, In, Sn, La, and Ce), $LiNi_{x2}Co_{y2}Mn_{z2}O_2$ ($0<x2<1$, $0<y2<1$, $0<z2<1$, and $x2+y2+z2=1$), or $LiNi_{x3}Co_{y3}Al_{z3}O_2$ ($0<x3<1$, $0<y3<1$, $0<z3<1$, and $x3+y3+z3=1$).

The active material having the particle diameter of less than or equal to 2 μm may include a compound capable of reversibly intercalating and deintercalating lithium and a carbon coating layer on the surface thereof. In this case, the safety functional layer including the same may effectively suppress overheating and explosion of the battery when a physical issue occurs, while helping to facilitate the movement of electrons and lithium ions in the electrode at normal times.

The carbon coating layer may be included in an amount of 1 wt % to 20 wt %, for example, 1 wt % to 18 wt %, 1 wt % to 16 wt %, 1 wt % to 15 wt %, 2 wt % to 12 wt %, 2 wt % to 10 wt %, or 4 wt % to 8 wt %, based on 100 wt % of the active material having the particle diameter of less than or equal to 2 μm. When the content of the carbon coating layer satisfies the above range, the active material having a particle diameter of less than or equal to 2 μm may help ensure smooth movement of lithium ions and the battery in the safety functional layer, thereby improving the basic performance of the battery.

The carbon coating layer may be continuously formed on the surface of the compound capable of reversibly intercalating and deintercalating lithium, or may be formed in an island shape.

The active material having the particle diameter of less than or equal to 2 μm may include, for example, lithium iron phosphate and a carbon coating layer on the surface thereof, or may include lithium cobalt oxide and a carbon coating layer on the surface thereof.

The active material having the particle diameter of less than or equal to 2 μm may be included in an amount of 5 wt % to 80 wt %, for example, 5 wt % to 70 wt %, 5 wt % to 60 wt %, or 5 wt % to 50 wt %, or 10 wt % to 50 wt %, or 20 wt % to 50 wt % based on 100 wt % of the safety functional layer. In this case, the safety functional layer may help smooth movement of lithium ions and electrons in normal times, and can effectively suppress overheating and explosion of the battery when a physical issue occurs.

Any polymer that expands or melts at a temperature higher than room temperature can be used without limitation as the heat-expandable polymer. The heat-expandable polymer may be a polymer that expands in the temperature range of at 70° C. to 200° C., for example, 70° C. to 180° C., 70° C. to 160° C., 80° C. to 200° C., 100° C. to 200° C., 100° C. to 180° C., or 100° C. to 160° C.

In addition, the heat-expandable polymer may be one that melts at 100° C. to 200° C., for example, a polymer that melts at a temperature range of 100° C. to 180° C., or 110° C. to 170° C. This may mean the melting point ($T_m$) of the heat-expandable polymer.

Specific examples of the heat-expandable polymer may include, for example, polyolefin, polystyrene, an ethylene-vinyl acetate copolymer, an ethylene-acrylic acid copolymer, an ethylene-methacrylic acid copolymer, polytetrafluoroethylene, polyamide, polyacrylonitrile, a thermoplastic elastomer, polyethylene oxide, polyacetal, thermoplastically modified cellulose, polysulfone, a (meth)acrylate copolymer, polymethyl (meth)acrylate, a copolymer thereof, or a combination thereof.

Herein, the polyolefin may include, for example, polyethylene, polypropylene, polymethylpentene, polybutene, a modified product thereof, or a combination thereof. The polyethylene may specifically include high-density polyethylene (density: 0.94 g/cc to 0.965 g/cc), medium-density polyethylene (density: 0.925 g/cc to 0.94 g/cc), low-density polyethylene (density: 0.91 g/cc to 0.925 g/cc), very low-density polyethylene (density: 0.85 g/cc to 0.91 g/cc), or a combination thereof.

For example, the heat-expandable polymer may include polyethylene, polypropylene, or a combination thereof.

The heat-expandable polymer may, for example, exist in the form of particles. In this case, the heat-expandable polymer particles may be spherical or plate-shaped.

An average particle diameter of the heat-expandable polymer may be 50 nm to 10 μm, for example 50 nm to 8 μm, 50 nm to 5 μm, 50 nm to 3 μm, 50 nm to 1 μm, or 50 nm to 800 nm. When the particle diameter of the heat-expandable polymer satisfies the above range, ion channels may be effectively closed even with a small amount of the heat-expandable polymer. The particle diameter of the heat-expandable polymer may also be referred to as an average particle diameter, and may mean D50, which is the diameter of a particle whose cumulative volume is 50 volume % in the particle size distribution. The particle diameter of the heat-expandable polymer may be measured using a particle size analyzer or may be measured through a photograph taken with an electron microscope such as SEM or TEM. Alternatively, the average particle diameter (D50) may be obtained by measuring a particle size with a device using dynamic light-scattering, performing a data analysis, counting the number of particles in each particle size range, and calculating D50 from this. On the other hand, when the heat-expandable polymer is plate-shaped, the particle diameter may mean the length of a major axis, which means the maximum length based on the widest surface of the plate-shaped particle.

The heat-expandable polymer may be included in an amount of 10 wt % to 90 wt %, for example, 10 wt % to 85 wt %, 10 wt % to 80 wt %, 10 wt % to 70 wt %, 20 wt % to 60 wt %, or 20 wt % to 50 wt %, based on 100 wt % of the safety functional layer. When the content range of the heat-expandable polymer is as described above, the safety functional layer may effectively suppress overheating and explosion of the battery when a physical issue occurs and improve basic performance of the battery.

The safety functional layer may further include a conductive material.

The conductive material may include a carbon material, a metal material, a metal carbide, a metal nitride, a metal silicide, or a combination thereof. The carbon material may be carbon black, graphite, carbon fiber, carbon nanotube (CNT), or a combination thereof, and the carbon black may include, for example, acetylene black, ketjen black, channel black, furnace black, lamp black, thermal black, or a combination thereof, and the graphite may include natural graphite, artificial graphite, or a combination thereof. The metal material may be metal particles or metal fibers such as nickel. The metal carbide may include, for example, WC, $B_4C$, ZrC, NbC, MoC, TiC, TaC, or a combination thereof, the metal nitride may include TiN, ZrN, TaN, or a combination thereof, and the metal silicide may include, for example, $WSi_2$, $MoSi_2$, or a combination thereof.

The conductive material may be included in an amount of 1 wt % to 30 wt %, for example, 1 wt % to 25 wt %, 1 wt % to 20 wt %, 5 wt % to 20 wt %, or 10 wt % to 20 wt % based on 100 wt % of the safety functional layer. When the content of the conductive material satisfies the range, the safety functional layer may help smooth movement of electrons and lithium in normal times, thereby improving the basic performance of the battery, and when a physical issue occurs, overheating or explosion of the battery may be effectively suppressed.

The safety functional layer may further include a binder.

The binder may play a role of well attaching the materials in the safety functional layer to each other and well bonding the active material layer and the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder or a polymer resin binder. The rubber binder may be selected from a styrene-butadiene rubber (SBR), an acrylated styrene-butadiene rubber, an acrylonitrile-butadiene rubber (ABR), an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and used. The alkali metal may be Na, K, or Li.

The binder may be included in an amount of 1 wt % to 30 wt %, for example, 1 wt % to 25 wt %, 1 wt % to 20 wt %, 5 wt % to 20 wt %, or 5 wt % to 15 wt % based on 100 wt % of the safety functional layer. When the content of the binder satisfies this requirement, the safety functional layer may exhibit excellent adhesive strength while maintaining excellent performance.

A thickness of the safety functional layer may be 0.5 μm to 10 μm, for example, 0.5 μm to 8 μm, 0.5 μm to 6 μm, 0.5 μm to 5 μm, or 0.5 μm to 5 μm. When the safety functional layer satisfies the thickness range, the movement distance of electrons or ions within the safety functional layer is sufficiently short, so that uniform battery performance may be exhibited, output characteristics may be improved, and at the same time, when a physical issue occurs, ion or current flow may be effectively blocked.

In the electrode for a rechargeable lithium battery, the current collector may be selected from aluminum foil, copper foil, nickel foil, stainless steel foil, titanium foil, nickel foam, copper foam, a polymer substrate coated with a conductive metal, and a combination thereof.

In the electrode for a rechargeable lithium battery, the active material layer may include an active material, and the particle size of the active material may be larger than that of the active material included in the safety functional layer having a particle diameter of less than or equal to 2 μm. For example, the active material included in the active material layer may have a particle diameter of 10 μm to 30 μm, for example, 10 μm to 25 μm, or 10 μm to 20 μm.

In addition to the active material, the active material layer may further include a binder and/or a conductive material. Details of the active material, binder, and conductive material of the active material layer will be described in each of the positive electrode active material layer and the negative electrode active material layer.

An electrode for a rechargeable lithium battery according to an embodiment may be a positive electrode or a negative electrode.

A positive electrode for a rechargeable lithium battery may include a current collector and a positive electrode active material layer formed on the current collector. According to an embodiment, the aforementioned safety functional layer may be included between the current collector and the positive electrode active material layer.

The positive electrode may include a positive electrode active material and may further include a binder and/or a conductive material.

The positive electrode active material may include a lithiated intercalation compound capable of reversibly intercalating and deintercalating lithium. Examples of the positive electrode active material include a compound represented by any one of the following chemical formulas:

$Li_aA_{1-b}X_bD_2 (0.90 \leq a \leq 1.8, 0 \leq b \leq 0.5)$;

$Li_aA_{1-b}X_bO_{2-c}D_c (0.90 \leq a \leq 1.8, 0 \leq b \leq 0.5, 0 \leq c \leq 0.05)$;

$Li_aE_{1-b}X_bO_{2-c}D_c (0.90 \leq a \leq 1.8, 0 \leq b \leq 0.5, 0 \leq c \leq 0.05)$;

$Li_aE_{2-b}X_bO_{4-c}D_c (0.90 \leq a \leq 1.8, 0 \leq b \leq 0.5, 0 \leq c \leq 0.05)$;

$Li_aNi_{1-b-c}Co_bX_cD_\alpha (0.90 \leq a \leq 1.8, 0 \leq b \leq 0.5, 0 \leq c \leq 0.5, 0 < \alpha \leq 2)$;

$Li_aNi_{1-b-c}Co_bX_cO_{2-\alpha}T_\alpha (0.90 \leq a \leq 1.8, 0 \leq b \leq 0.5, 0 \leq c \leq 0.05, 0 < \alpha < 2)$;

$Li_aNi_{1-b-c}Co_bX_cO_{2-\alpha}T_2 (0.90 \leq a \leq 1.8, 0 \leq b \leq 0.5, 0 \leq c \leq 0.05, 0 < \alpha < 2)$;

$Li_aNi_{1-b-c}Mn_bX_cD_\alpha (0.90 \leq a \leq 1.8, 0 \leq b \leq 0.5, 0 < c < 0.05, 0 < \alpha \leq 2)$;

$Li_aNi_{1-b-c}Mn_bX_cO_{2-\alpha}T_\alpha (0.90 \leq a \leq 1.8, 0 \leq b \leq 0.5, 0 \leq c \leq 0.05, 0 < \alpha < 2)$;

$Li_aNi_{1-b-c}Mn_bX_cO_{2-\alpha}T_2 (0.90 \leq a \leq 1.8, 0 \leq b \leq 0.5, 0 \leq c \leq 0.05, 0 < \alpha < 2)$;

$Li_aNi_bE_cG_dO_2 (0.90 \leq a \leq 1.8, 0 \leq b \leq 0.9, 0 \leq c \leq 0.5, 0.001 \leq d \leq 0.1)$;

$Li_aNi_bCo_cMn_dG_eO_2 (0.90 \leq a \leq 1.8, 0 \leq b \leq 0.9, 0 \leq c \leq 0.5, 0 \leq d \leq 0.5, 0.001 \leq e \leq 0.1)$;

$Li_aNiG_bO_2 (0.90 \leq a \leq 1.8, 0.001 \leq b \leq 0.1)$;

$Li_aCoG_bO_2 (0.90 \leq a \leq 1.8, 0.001 \leq b \leq 0.1)$;

$Li_aMn_{1-b}G_bO_2 (0.90 \leq a \leq 1.8, 0.001 \leq b \leq 0.1)$;

$Li_aMn_2G_bO_4 (0.90 \leq a \leq 1.8, 0.001 \leq b \leq 0.1)$;

$Li_aMn_{1-b}G_bPO_4 (0.90 \leq a \leq 1.8, 0 \leq g \leq 0.5)$;

$QO_2; QS_2; LiQS_2$;

$V_2O_5; LiV_2O_5$;

$LiZO_2$;

$LiNiVO_4$;

$Li_{(3-f)}J_2(PO_4)_3 (0 \leq f \leq 2)$;

$Li_{(3-f)}Fe_2(PO_4)_3 (0 \leq f \leq 2)$;

$Li_aFePO_4 (0.90 \leq a \leq 1.8)$.

wherein, in the above chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

Of course, one having a coating layer on the surface of the compound may be used, or a mixture of the compound and a compound having a coating layer may be used. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a combination thereof. The coating layer forming process may use a method that does not adversely affect the physical properties of the positive electrode active material, such as spray coating or dipping.

The positive electrode active material may be, for example, at least one of lithium composite oxides represented by Chemical Formula 11.

[Chemical Formula 11]

$Li_aM^{11}_{1-y11-z11}M^{12}_{y11}M^{13}_{z11}O_2$

In Chemical Formula 11, $0.9 \leq a \leq 1.8$, $0 \leq y11 \leq 1$, $0 \leq z11 \leq 1$, $0 \leq y11+z11<1$, and $M^{11}$, $M^{12}$, and $M^{13}$ are each independently an element of Ni, Co, Mn, Al, Mg, Ti, or Fe, and a combination of thereof.

For example, $M^{11}$ may be Ni, and $M^{12}$ and $M^{13}$ may each independently be a metal such as Co, Mn, Al, Mg, Ti, or Fe. In a specific embodiment, $M^{11}$ may be Ni, $M^{12}$ may be Co, and $M^{13}$ may be Mn or Al, but they not limited thereto.

In a specific embodiment, the positive electrode active material may be a lithium composite oxide represented by Chemical Formula 12.

[Chemical Formula 12]

$Li_{x12}Ni_{y12}CO_{z12}Al_{1-y12-z12}O_2$

In Chemical Formula 12, $0.9 \leq x12 \leq 1.2$, $0.5 \leq y12 \leq 1$, and $0 \leq z12 \leq 0.5$.

The content of the positive electrode active material may be 90 wt % to 98 wt %, for example, 90 wt % to 96 wt %, based on the total weight of the positive electrode active material layer. The content of the binder and the conductive material may be 1 wt % to 5 wt %, respectively, based on the total weight of the positive electrode active material layer.

The binder improves binding properties of positive electrode active material particles with one another and with a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

An aluminum foil may be used as the current collector, but is not limited thereto.

A negative electrode for a rechargeable lithium battery includes a current collector and a negative electrode active material layer formed on the current collector and including a negative electrode active material. According to an embodiment, the aforementioned safety functional layer may be included between the current collector and the negative electrode active material layer.

The negative electrode active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, for example crystalline carbon, amorphous carbon, or a combination thereof as a carbon-based negative electrode active material. The crystalline carbon may be non-shaped, or sheet, flake, spherical, or fiber shaped natural graphite or artificial graphite and the amorphous carbon may be a soft carbon, a hard carbon, a mesophase pitch carbonization product, calcined coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative electrode active material or a Sn-based negative electrode active material, wherein the Si-based negative electrode active material may include silicon, a silicon-carbon composite, $SiO_x$ $(0<x<2)$, a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative electrode active material may include Sn, $SnO_2$, a Sn—R alloy (wherein R is an alkali metal, an alkaline-earth metal, a Group 13 element, a Group 14 element, a Group 15 element, a Group 16 element, a transition metal, a rare earth element, and a combination thereof, but not Sn), and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, or a polymer resin such as a phenol resin, a furan resin, or a polyimide resin. In this case, the content of silicon may be 10 wt % to 50 wt % based on the total weight of the silicon-carbon composite. In addition, the content of the crystalline carbon may be 10 wt % to 70 wt % based on the total weight of the silicon-carbon composite, and the content of the amorphous carbon may be 20 wt % to 40 wt % based on the total weight of the silicon-carbon composite. In addition, a thickness of the amorphous carbon coating layer may be 5 nm to 100 nm. An average particle diameter (D50) of the silicon particles may be 10 nm to 20 μm. The average particle diameter (D50) of the silicon particles may be preferably 10 nm to 200 nm. The silicon particles may exist in an oxidized form, and in this case, an atomic content ratio of Si:O in the silicon particles indicating a degree of oxidation may be a weight ratio of 99:1 to 33:67. The silicon particles may be $SiO_x$ particles, and in this case, the range of x in $SiO_x$ may be greater than 0 and less than 2. In the present specification, unless otherwise defined, an average particle diameter (D50) indicates a particle where a cumulative volume is 50 volume % in a particle distribution.

The Si-based negative electrode active material or Sn-based negative electrode active material may be mixed with the carbon-based negative electrode active material. When the Si-based negative electrode active material or Sn-based negative electrode active material and the carbon-based negative electrode active material are mixed and used, the mixing ratio may be a weight ratio of 1:99 to 90:10.

In the negative electrode active material layer, the negative electrode active material may be included in an amount of 95 wt % to 99 wt % based on the total weight of the negative electrode active material layer.

In an embodiment, the negative electrode active material layer further includes a binder, and may optionally further include a conductive material. The content of the binder in the negative electrode active material layer may be 1 wt % to 5 wt % based on the total weight of the negative electrode active material layer. In addition, when the conductive material is further included, the negative electrode active material layer may include 90 wt % to 98 wt % of the negative electrode active material, 1 wt % to 5 wt % of the binder, and 1 wt % to 5 wt % of the conductive material.

The binder serves to well adhere the negative electrode active material particles to each other and also to adhere the negative electrode active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may be a rubber-based binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and used. The alkali metal may be Na, K, or Li. The amount of the thickener used may be 0.1 parts by weight to 3 parts by weight based on 100 parts by weight of the negative electrode active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

Another embodiment provides a rechargeable lithium battery including a positive electrode, a negative electrode, a separator between the positive electrode and the positive electrode, and an electrolyte. Herein, the aforementioned electrode may be an positive electrode and/or a negative electrode.

FIG. 1 is a schematic view illustrating a rechargeable lithium battery according to an embodiment. Referring to FIG. 1, a rechargeable lithium battery 100 according to an embodiment of the present invention includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, negative electrode 112, and separator 113, a battery case 120 housing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, or alcohol-based solvent, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like. In addition, the alcohol-based solvent may include ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, or an ether bond), amides such as dimethylformamide, dioxolanes such as 1,3-dioxolane, sulfolanes, and the like.

The non-aqueous organic solvent may be used alone or in a mixture, and when used in a mixture, the mixing ratio may be appropriately adjusted in accordance with a desired battery performance, which is widely understood by those skilled in the art.

In addition, in the case of the carbonate-based solvent, a mixture of a cyclic carbonate and a chain carbonate may be used. In this case, when the cyclic carbonate and the chain carbonate are mixed in a volume ratio of about 1:1 to about 1:9, the electrolyte may exhibit excellent performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

The aromatic hydrocarbon-based solvent may be an aromatic hydrocarbon-based compound represented by Chemical Formula I.

[Chemical Formula I]

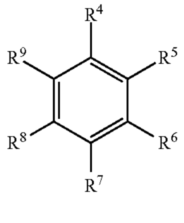

In Chemical Formula I, $R^4$ to $R^9$ are the same or different and are selected from hydrogen, a halogen, a C1 to C10 alkyl group, a haloalkyl group, and a combination thereof.

Specific examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula II in order to improve cycle-life of a battery.

[Chemical Formula II]

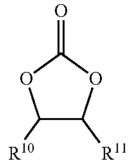

In Chemical Formula II, $R^{10}$ and $R^{11}$ are the same or different and selected from hydrogen, a halogen, a cyano group, a nitro group, and fluorinated C1 to C5 alkyl group, provided that at least one of $R^{10}$ and $R^{11}$ is a halogen, a cyano group, a nitro group, and a fluorinated C1 to C5 alkyl group, and $R^{10}$ and $R^{11}$ are not simultaneously hydrogen.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide; LiFSI), $LiC_4FsSO_3$, $LiClO_4$, $LiAlO_2$, $LiAlCl_4$, $LiPO_2F_2$, $LiN(C_xF_{2x+1}SO_2)(C_yF_{2y+1}SO_2)$ wherein x and y are natural numbers, for example, an integer ranging from 1 to 20, lithium difluoro (bisoxolato) phosphate, LiCl, LiI, $LiB(C_2O_4)_2$ (lithium bis (oxalato) borate; LiBOB), and lithium difluoro(oxalato) borate (LiDFOB).

The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The separator 113 that is also called a separating layer separates a positive electrode 114 and a negative electrode 112 and provides a transporting passage for lithium ions and may be any generally-used separator in a lithium ion battery. In other words, it may have low resistance to ion transport and excellent impregnation for an electrolyte. For example, separator may be selected from a glass fiber, polyester, Teflon, polyethylene, polypropylene, polytetrafluoroethylene, or a combination thereof. It may have a form of a non-woven fabric or a woven fabric. For example, in a lithium ion battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Structures and manufacturing methods of these batteries are well known in the art, and thus detailed descriptions thereof will be omitted.

DETAILED DESCRIPTION OF THE EMBODIMENTS

Hereinafter, examples of the present invention and comparative examples are described. It is to be understood, however, that the examples are for the purpose of illustration and are not to be construed as limiting the present invention.

Example 1

(1) Manufacture of Safety Functional Layer

A safety functional layer slurry is prepared by mixing 39 wt % of polypropylene heat-expandable polymer having an average particle diameter (D50) of 300 nm, 36 wt % of lithium iron phosphate coated with carbon having an average particle diameter (D50) of about 300 nm and a carbon content of 6 wt %, 15 wt % of weight carbon black, and 10 wt % of a polyamide-based binder.

(2) Manufacture of Positive Electrode

The positive electrode active material slurry is prepared by mixing 95 wt % of $LiCoO_2$ positive electrode active material, 3 wt % of polyvinylidene fluoride binder, and 2 wt % of ketjen black conductive material in an N-methylpyrrolidone solvent.

The safety functional layer slurry is coated on an aluminum current collector to a thickness of about 2 μm and dried. Subsequently, the positive electrode active material slurry is applied on the safety functional layer and dried. A positive electrode plate is manufactured by compressing the dried electrode plate.

Figure 2:
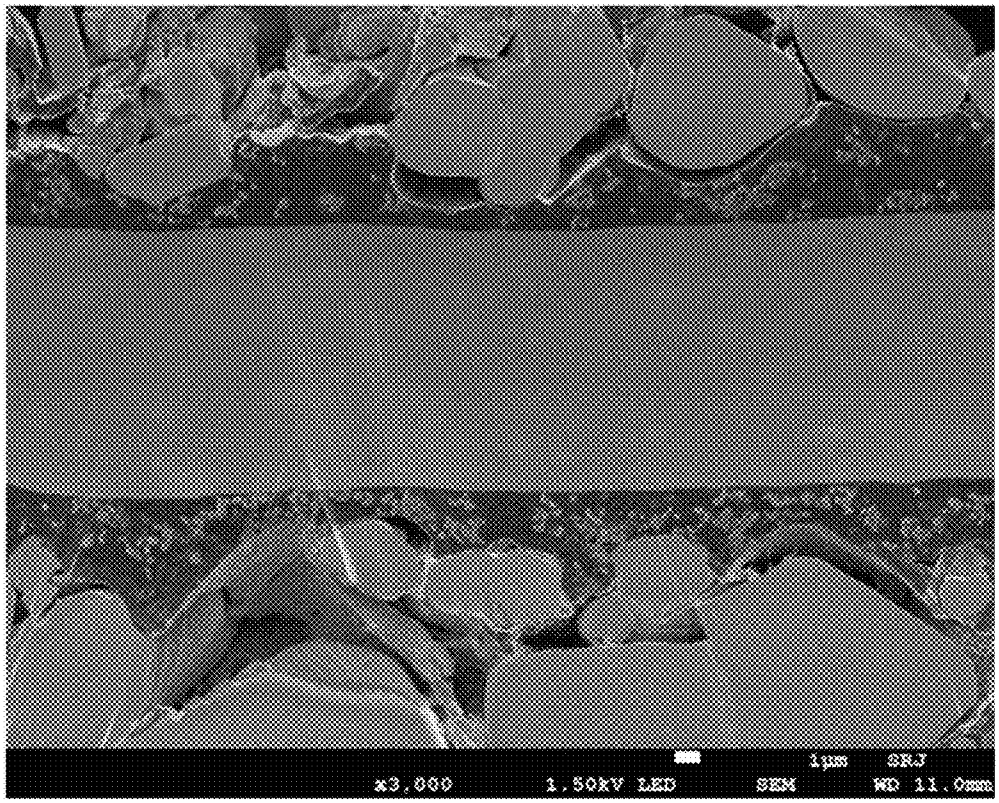
FIG. 2 is a scanning electron microscope photograph of a cross section of an electrode manufactured in Example 1.

FIG. 2 is a scanning electron microscope photograph of a cross section of the positive electrode plate of Example 1, wherein a gray layer in the middle is a current collector, large gray particles in the upper and lower portions are an active material of an active material layer, a dark gray portion between the active material layer and the current collector is a safety functional layer, and small gray particles are an active material with a particle diameter of 2 μm or less.

(3) Manufacture of Negative Electrode 97.3 wt % of a negative electrode active material graphite, 0.5 wt % of denka black, 0.9 wt % of carboxylmethyl cellulose, and 1.3 wt % of styrene butadiene rubber are mixed in an aqueous solvent to prepare a negative electrode active material slurry. It is coated on a copper foil and dried. A negative electrode plate is manufactured by compressing the dried electrode plate.

(4) Manufacture of Battery Cell

The manufactured positive electrode, the polyethylene/polypropylene multilayer separator, and the manufactured negative electrode are sequentially stacked to manufacture to a pouch-type cell, and then an electrolyte including 1.0 M $LiPF_6$ in a solvent mixed with ethylene carbonate and diethyl carbonate at a volume ratio of 50:50 is injected to manufacture a rechargeable lithium battery cell.

Example 2

A safety functional layer, a positive electrode, a negative electrode, and a battery cell are manufactured in the same method as in Example 1 except that the safety functional layer is coated with a thickness of 1.5 μm in the preparation of the positive electrode of Example 1.

Example 3

A safety functional layer, a positive electrode, a negative electrode, and a battery cell are manufactured in the same method as in Example 1 except that the safety functional layer is coated with a thickness of 1 μm in the preparation of the positive electrode of Example 1.

Comparative Example 1

A positive electrode, a negative electrode, and a battery cell are manufactured in the same manner as in Example 1 except that the positive electrode active material slurry alone is coated on a current collector without coating the safety functional layer and then, dried and compressed to manufacture the positive electrode.

Comparative Example 2

A positive electrode, a negative electrode, and a battery cell are manufactured in the same manner as in Example 1 except that the safety functional layer is formed by coating safety functional layer slurry prepared by mixing 50 wt % of the same heat-expandable polymer, 25 wt % of carbon black, and 25% of a binder without using carbon coating lithium iron phosphate.

Evaluation Example 1: Evaluation of Resistance Increase Rate According to Temperature After attaching a temperature sensor and a resistance measuring device to the positive electrode plates according to Example 1 and Comparative Example 1 and placing them in a temperature varying chamber, the positive electrode plates are measured with respect to resistance changes according to a temperature, while a temperature is increased at 10° C./min, and the results are shown in FIG. 3.

Figure 3:
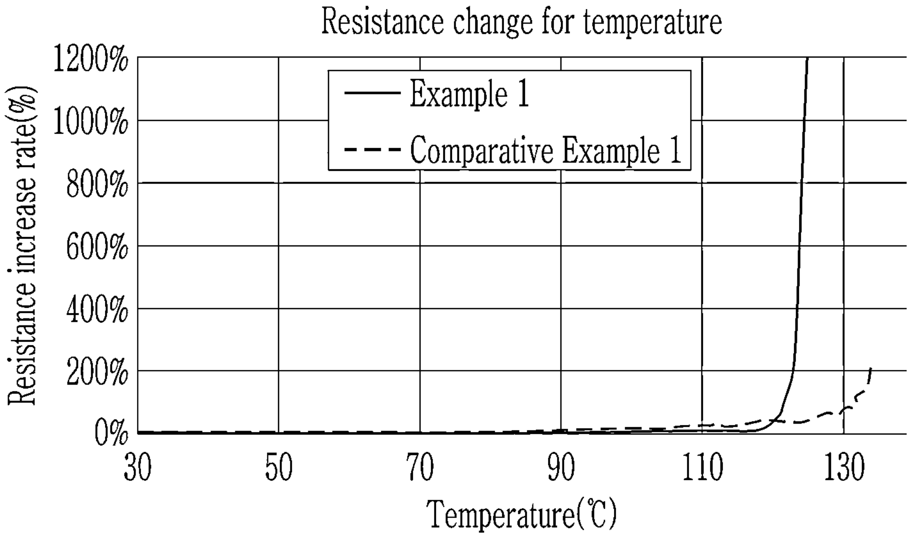
FIG. 3 is a graph showing the resistance increase rates according to the temperature of the battery cells of Example 1 and Comparative Example 1.

Referring to FIG. 3, the electrode plate of Example 1 exhibits significantly increased resistance at a high temperature of greater than or equal to 120° C. Accordingly, the battery cell of Example 1 effectively suppresses a passage of electrons and ions during the overheating or thermal runway, thereby exhibiting a shutdown function at an early stage.

Evaluation Example 2: Evaluation of External Short Circuit

Figure 4:
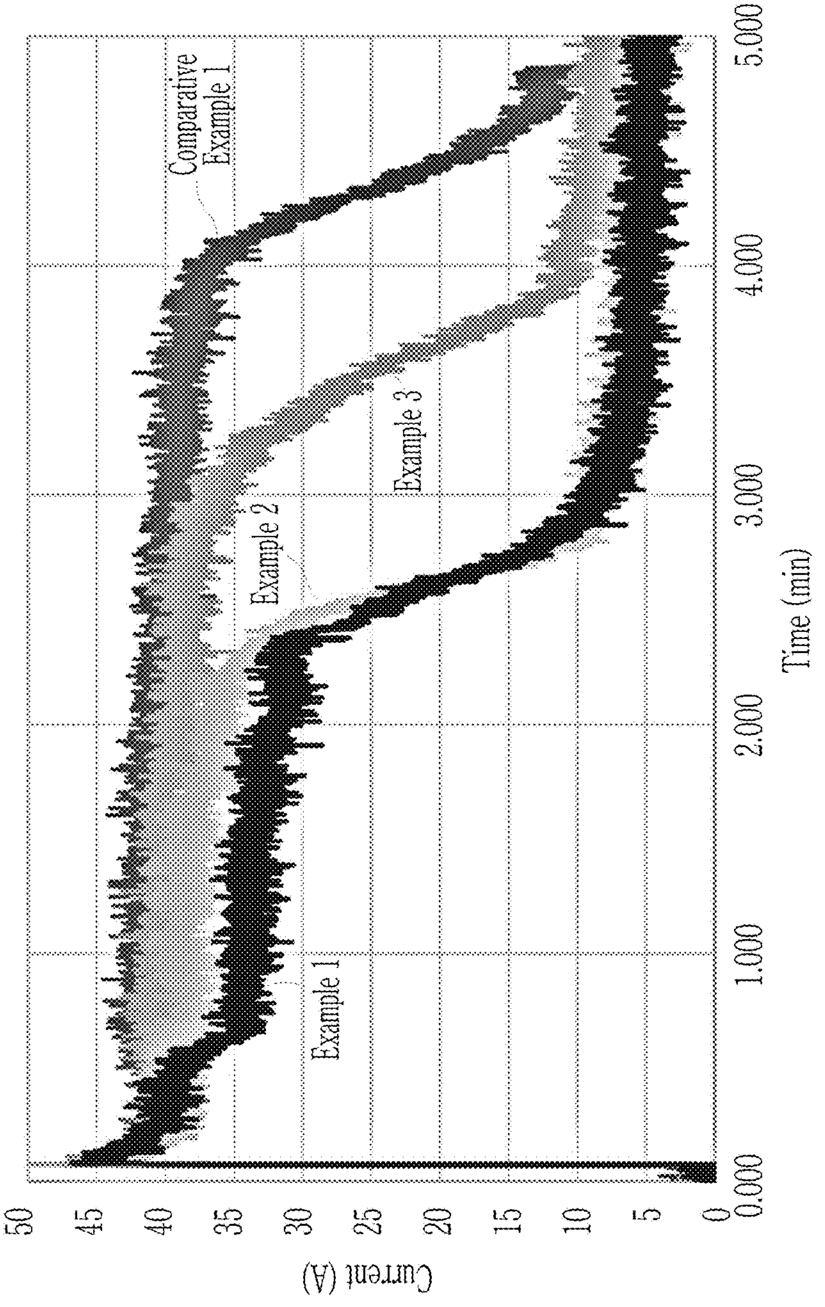
FIG. 4 is a graph showing an external short circuit evaluation of the battery cells of Examples 1 to 3 and Comparative Example 1.

The battery cells according to Examples 1 to 3 and Comparative Example 1 are fully charged to 4.47 V and, after connecting wires to the positive and negative electrodes and connecting the to a 50 mΩ resistor, measured with respect to a current flowing through the wires, and the results are shown in FIG. 4.

Referring to FIG. 4, in Examples 1 to 3, the safety functional layer effectively suppresses a current flow at an external short circuit, thereby exhibiting a shutdown function at an early stage.

Evaluation Example 3: Evaluation of Cycle-Life Characteristics of Battery Cells The battery cells of Example 1 and Comparative Example 1 are charged to a voltage of 4.47 V at a 0.7 C rate under a constant current at room temperature (25° C.) and a high temperature (45° C.) and subsequently, cut off at a 0.05 C rate, while maintaining 4.47 V under a constant voltage. Accordingly, the battery cells are discharged to 3.0 V at a 1 C rate, and this charge and discharge cycle is 50 times repeated. After evaluating capacity changes according to cycles, the capacity change results at room temperature are shown as a graph in FIG. 5, and the capacity change results at a high temperature are shown as a graph in FIG. 6.

Figure 5:
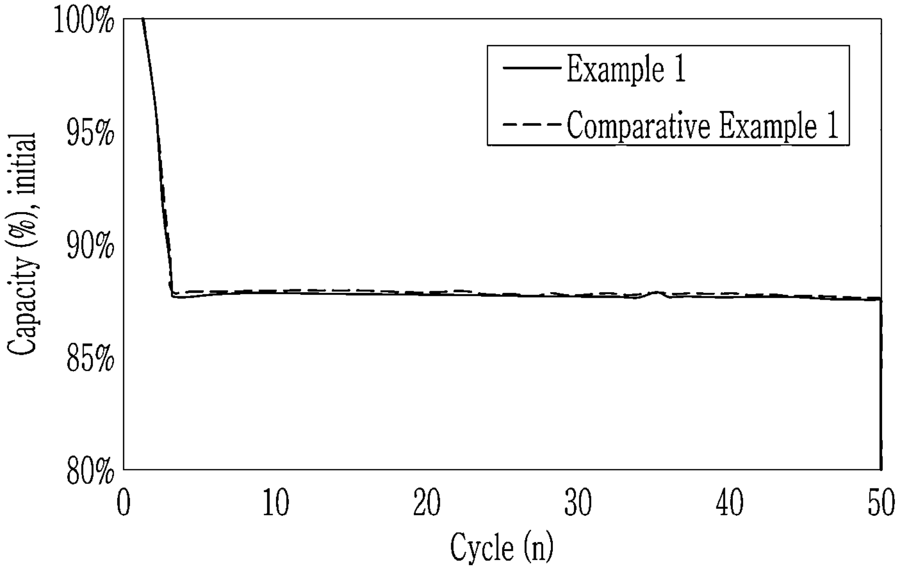
FIG. 5 is a graph showing room-temperature cycle-life characteristics of the battery cells of Example 1 and Comparative Example 1.
Figure 6:
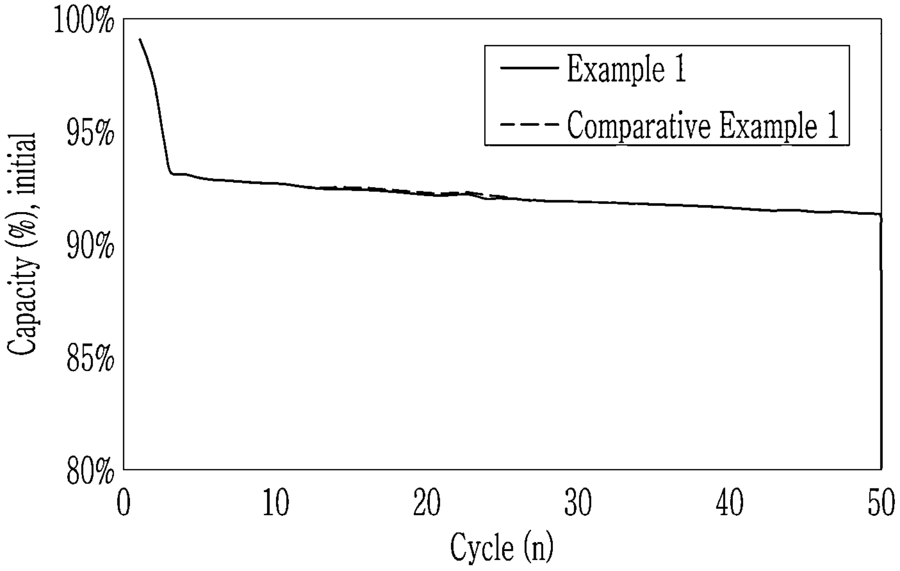
FIG. 6 is a graph showing high-temperature cycle-life characteristics of the battery cells of Example 1 and Comparative Example 1.

Referring to FIGS. 5 and 6, the battery cell of Example 1 maintains basic battery characteristics without a decrease in capacity characteristics and in cycle-life characteristics at all, compared with the cell of Comparative Example 1 into which the safety functional layer is introduced. In other words, the cell of Example 1 in which the safety functional layer is introduced into the positive electrode maintains battery reliability without a decrease in adhesion, a decrease in electrical conductivity inside the electrode, a decrease in energy density, and the like.

Evaluation Example 4: Evaluation of Penetration Safety

Figure 7:
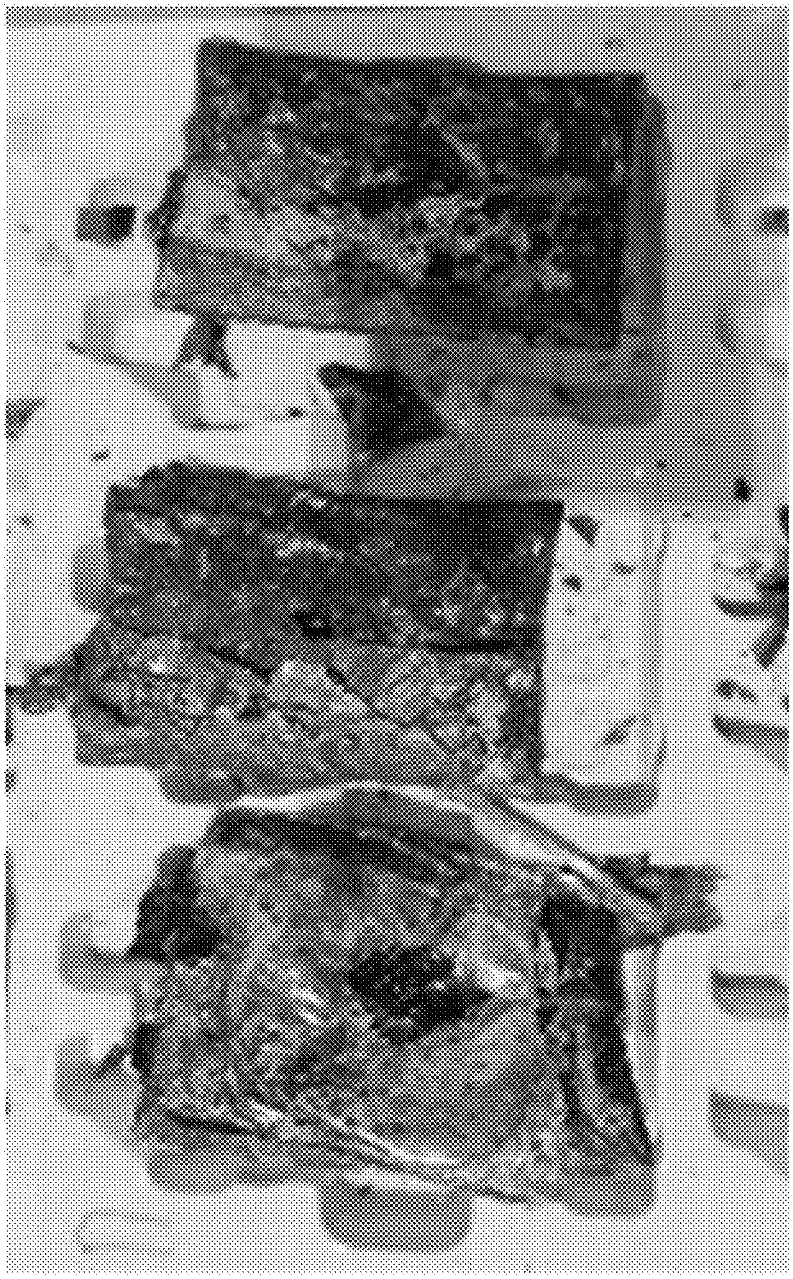
FIG. 7 is a photograph showing the results of the penetration safety evaluation of the battery cell of Comparative Example 1.
Figure 8:
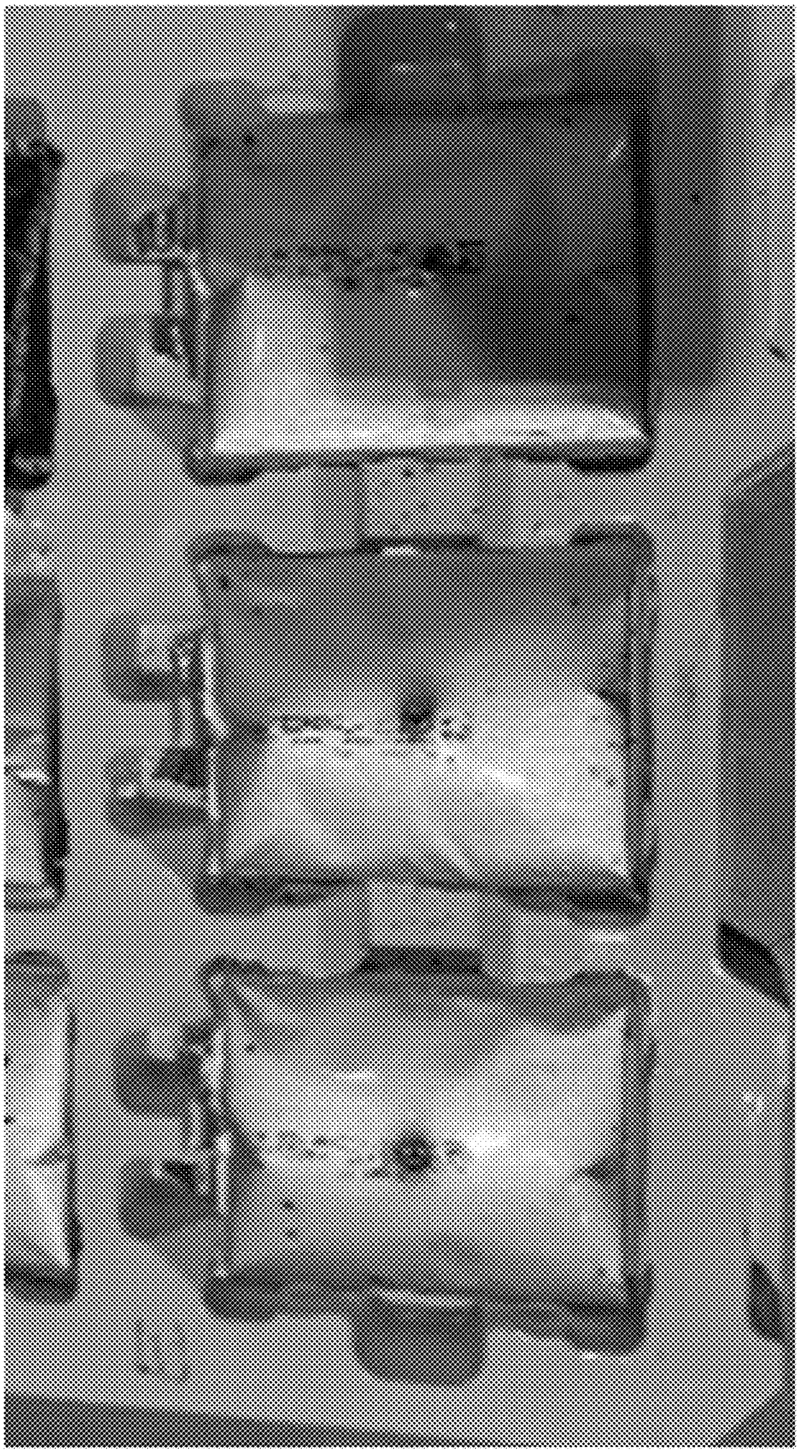
FIG. 8 is a photograph showing a result of the penetration safety evaluation of the battery cell of Example 1.

The battery cells of Example 1 and Comparative Example 1 are charged to 4.47 V at a 0.7 C rate and cut off at a 0.05 C rate and one hour later, completely penetrated by a pin with a diameter of 3 mm at 150 mm/sec through the center, and the result of Comparative Example 1 is shown in FIG. 7, and the result of Example 1 is shown in FIG. 8. All three of the three battery samples of Comparative Example 1 explode, whereas none of the three battery samples of Example 1 explodes. The battery cell of Example 1 succeeds in early shutdown before exploding or igniting due to the penetration, thereby securing penetration safety.

Evaluation Example 5: Evaluation of Thermal Runaway Safety

Figure 9:
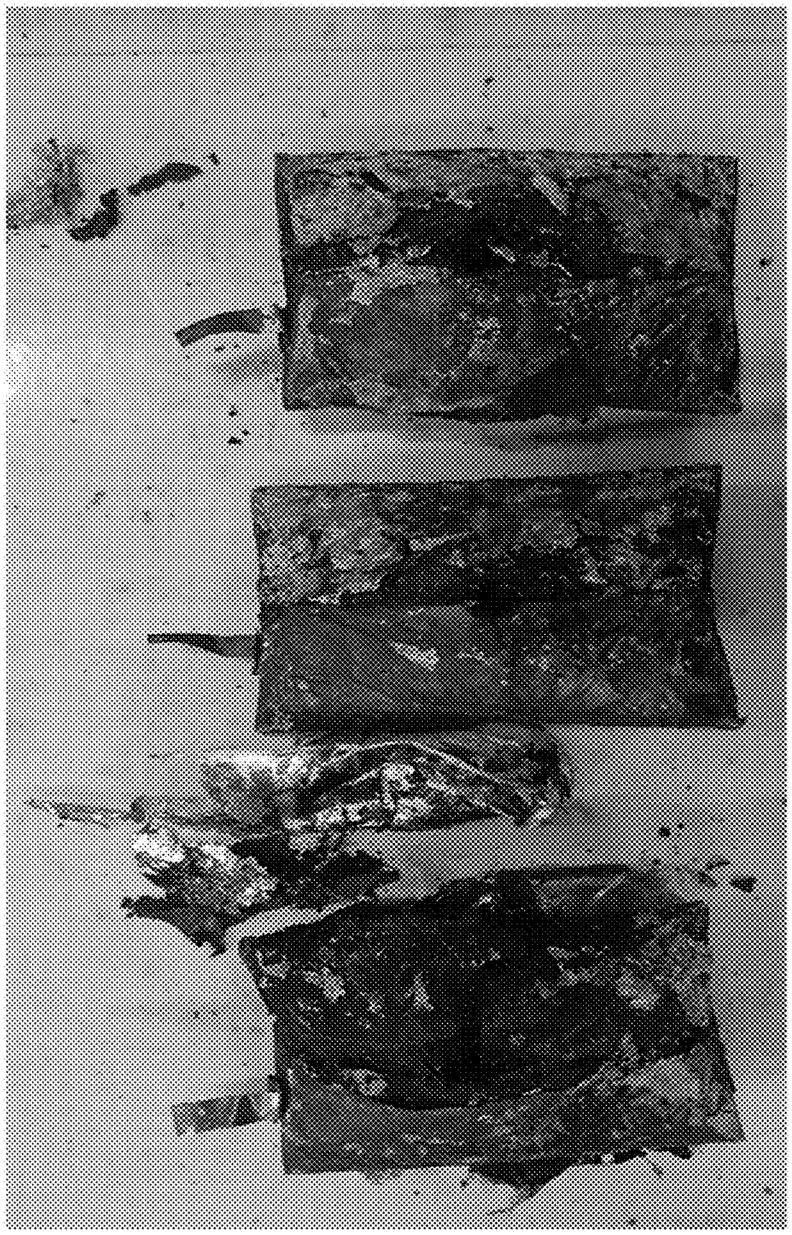
FIG. 9 is a photograph showing a thermal safety evaluation result of the battery cell of Comparative Example 1.
Figure 10:
FIG. 10 is a photograph showing a thermal safety evaluation result of the battery cell of Example 1.

The battery cells of Example 1 and Comparative Example 1 are charged 15 to 4.47 V at a 0.7 C rate and cut off at a 0.05 C rate and then, stored in a chamber at 134° C., and then, the results of Comparative Example 1 are shown in FIG. 9, while the results of Example 1 are shown in FIG. 10.

All three of the three battery samples of Comparative Example 1 explode, whereas none of the three battery samples of Example 1 explodes. The battery cell of Example 1 succeeds in an early shutdown at a thermal runaway, thereby securing thermal safety.

Evaluation Example 6: Evaluation of Crash Safety

Figure 11:
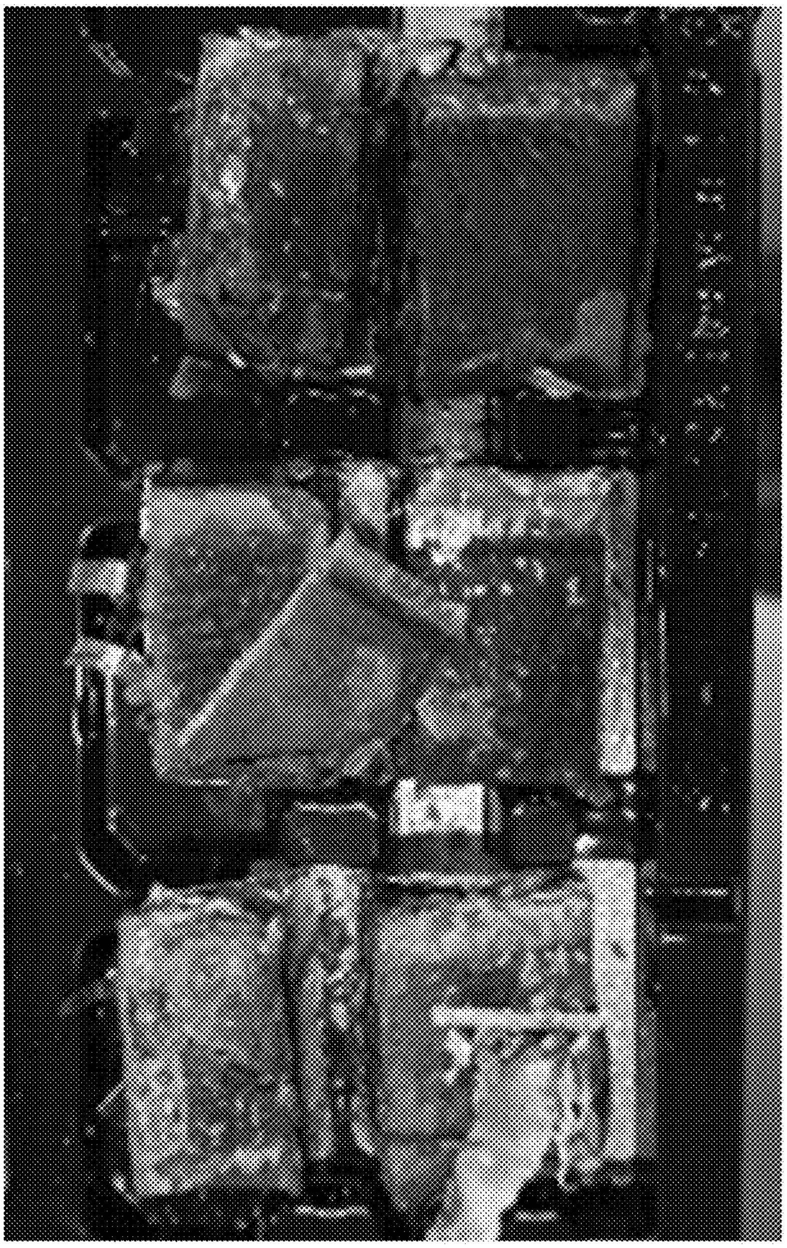
FIG. 11 is a photograph showing a crash safety evaluation result of a battery cell of Comparative Example 1.
Figure 12:
FIG. 12 is a photograph showing a crash safety evaluation result of the battery cell of Example 1.

The battery cells of Example 1 and Comparative Example 1 are fully charged to a maximum voltage at 0.5 C, cut off at a 0.05 C rate, and aged for 24 hours and then, evaluated with respect to crash safety, as follows. The fully charged battery samples are placed on a steel plate having a thickness of 5 cm or more, and a round bar (φ15.8±0.1 mm) is positioned in the center of each battery sample in a perpendicular direction of the electrode. Subsequently, a cylindrical weight having a weight of 9.1±0.46 kg is free-dropped onto the round bar from a height of 610±25 mm. After free-dropping the cylindrical weight, the evaluation is completed, when a temperature on the battery surface reaches room temperature +10° C. The results of Comparative Example 1 are shown in FIG. 11, and the results of Example 1 are shown in FIG. 12.

All three of three battery samples of Comparative Example 1 explode, whereas none of three battery samples of Example 1 explodes. The battery cell of Example 1 succeeds in early shutdown upon collision runaway, thereby securing thermal safety.

Evaluation Example 7: Evaluation of Capacity

Figure 13:
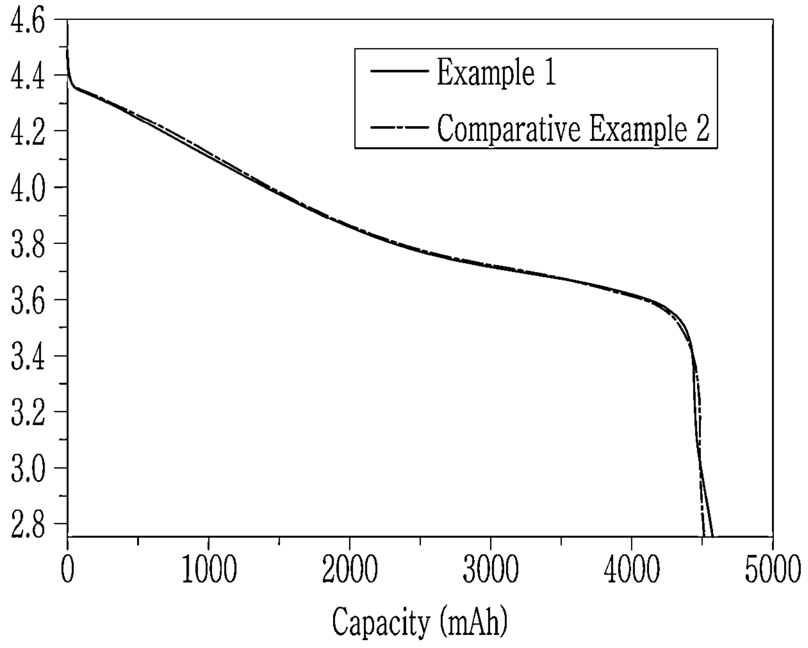
FIG. 13 is a graph showing capacity evaluation according to voltage for the battery cells of Example 1 and Comparative Example 2.

The battery cells of Example 1 and Comparative Example 2 are evaluated with respect to capacity according to a voltage, and the results are shown in FIG. 13. Referring to FIG. 13, compared with Comparative Example 2, Example 1 exhibits additional capacity at a voltage of 3.1 V or less. Referring to the evaluation results, the cell of Example 1 additionally exhibits about 2% capacity, compared with the cell of Comparative Example 2. The effect increase may be understood to be caused by the active material with a particle diameter of 2 μm or less included in the safety functional layer.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

| [Description of Symbols] | |
|---|---|
| 100: rechargeable lithium battery | 112: negative electrode |
| 113: separator | 114: positive electrode |
| 120: battery case | 140: sealing member |

The invention claimed is:

1. An electrode for a rechargeable lithium battery, comprising a current collector, a safety functional layer on the current collector, and an active material layer on the safety functional layer, wherein the safety functional layer includes a heat-expandable polymer, a binder comprising a polyamide-based binder, and an active material having a particle diameter of less than or equal to 2 μm, the active material layer includes an active material, and a particle diameter of the active material included in the active material layer is larger than the particle diameter of the active material included in the safety functional layer.

2. The electrode for the rechargeable lithium battery of claim 1, wherein, the safety functional layer includes the heat-expandable polymer and the active material having the particle diameter of less than or equal to 2 μm in a weight ratio of 1:9 to 9:1.

3. The electrode for the rechargeable lithium battery of claim 1, wherein, the active material having the particle diameter of less than or equal to 2 μm includes a compound capable of reversibly intercalating and deintercalating lithium, and the compound capable of reversibly intercalating and deintercalating lithium is lithium iron phosphate, lithium cobalt oxide, lithium manganese oxide, lithium nickel oxide, lithium nickel transition metal composite oxide, or a combination thereof.

4. The electrode for the rechargeable lithium battery of claim 3, wherein, the compound capable of reversibly intercalating and deintercalating lithium is $LiFePO_4$, $LiCoO_2$, $LiMn_2O_4$, $LiNiO_2$, $LiNi_xM^1_yM^2_zO_2$ ($0<x<1$, $0<y<1$, $0\leq z<1$, $x+y+z=1$, $M^1$, and $M^2$ are each independently at least one element selected from Co, Mn, Al, Cr, Fe, V, Mg, Ti, Zr, Nb, Mo, W, Cu, Zn, Ga, In, Sn, La, and Ce), or a combination thereof.

5. The electrode for the rechargeable lithium battery of claim 1, wherein, the active material having the particle diameter of less than or equal to 2 μm includes a compound capable of reversibly intercalating and deintercalating lithium and a carbon coating layer on the surface thereof.

6. The electrode for the rechargeable lithium battery of claim 5, wherein, the carbon coating layer is included in an amount of 1 wt % to 20 wt %, based on 100 wt % of the active material having the particle diameter of less than or equal to 2 μm.

7. The electrode for the rechargeable lithium battery of claim 1, wherein, the active material having the particle diameter of less than or equal to 2 μm has a particle diameter of 10 nm to 1 μm.

8. The electrode for the rechargeable lithium battery of claim 1, wherein, the active material having the particle diameter of less than or equal to 2 μm is included in an amount of 5 wt % to 80 wt %, based on 100 wt % of the safety functional layer.

9. The electrode for the rechargeable lithium battery of claim 1, wherein, the heat-expandable polymer is a polymer that expands at 70° C. to 200° C.

10. The electrode for the rechargeable lithium battery of claim 1, wherein, the heat-expandable polymer is a heat-expandable polymer that melts at 100° C. to 200° C.

11. The electrode for the rechargeable lithium battery of claim 1, wherein, the heat-expandable polymer includes polyolefin, polystyrene, ethylene-vinyl acetate copolymer, ethylene-acrylic acid copolymer, ethylene-methacrylic acid copolymer, polytetrafluoroethylene, polyamide, polyacrylonitrile, thermoplastic elastomer, polyethylene oxide, polyacetal, thermoplastically modified cellulose, polysulfone, (meth) acrylate copolymer, polymethyl (meth) acrylate, a copolymer thereof, or a combination thereof.

12. The electrode for the rechargeable lithium battery of claim 11, wherein, the polyolefin includes high-density polyethylene, medium-density polyethylene, low-density polyethylene, ultra-low-density polyethylene, polypropylene, polymethylpentene, polybutene, a modified product thereof, or a combination thereof.

13. The electrode for the rechargeable lithium battery of claim 1, wherein, the heat-expandable polymer is in form of particles, and the average particle diameter of the heat-expandable polymer is 50 nm to 10 μm.

14. The electrode for the rechargeable lithium battery of claim 1, wherein, the heat-expandable polymer is included in an amount of 10 wt % to 90 wt %, based on 100 wt % of the safety functional layer.

15. The electrode for the rechargeable lithium battery of claim 1, wherein, the safety functional layer further includes a conductive material, and the conductive material is included in an amount of 1 wt % to 30 wt %, based on 100 wt % of the safety functional layer.

16. The electrode for the rechargeable lithium battery of claim 1, wherein, the binder is included in an amount of 1 wt % to 30 wt % based on 100 wt % of the safety functional layer.

17. The electrode for the rechargeable lithium battery of claim 1, wherein, the thickness of the safety functional layer is 0.5 μm to 10 μm.

18. The electrode for the rechargeable lithium battery of claim 1, wherein, the active material included in the active material layer has a particle diameter of 10 μm to 30 μm.

19. The electrode for the rechargeable lithium battery of claim 1, wherein the electrode for the rechargeable lithium battery is a positive electrode.

20. A rechargeable lithium battery, comprising the electrode for the rechargeable lithium battery according to claim 1, a separator, and an electrolyte.

* * * * *